United States Patent [19]

Garvin

[11] 4,291,648

[45] Sep. 29, 1981

[54] LIVESTOCK FEEDER

[76] Inventor: Gregory A. Garvin, Rte. 1, Box 106-A, Broad Run, Va. 22014

[21] Appl. No.: 32,492

[22] Filed: Apr. 23, 1979

[51] Int. Cl.³ .............................................. A01K 5/01
[52] U.S. Cl. ..................................................... 119/61
[58] Field of Search .................. 119/121, 51 R, 52 R, 119/61

[56] References Cited

U.S. PATENT DOCUMENTS

| D. 101,140 | 9/1936 | Robertson | 119/61 X |
|---|---|---|---|
| 336,209 | 2/1886 | Burrows | 119/61 |
| 2,720,862 | 10/1955 | Davis | 119/51 R |
| 2,826,171 | 3/1958 | Piel | 119/52 R |
| 3,205,860 | 9/1965 | Moore | 119/61 X |

FOREIGN PATENT DOCUMENTS

| 2277527 | 2/1976 | France | 119/61 |
| 1344267 | 1/1974 | United Kingdom | 119/61 |

Primary Examiner—G. E. McNeill
Assistant Examiner—Robert P. Swiatek
Attorney, Agent, or Firm—Birch, Stewart, Kolasch & Birch

[57] ABSTRACT

The present invention is directed to a feeder-watering trough for animals. The trough is designed with a centrally disposed portion having an inclined top surface. The centrally disposed portion is connected to an outer retaining wall by means of a bottom member. Feed or water is positioned in the area between the outer retaining wall and the centrally disposed portion so as to be conveniently located with respect to an animal utilizing the trough. The feeder-watering trough of the present invention is disposed on a central support which is designed to adjust the height of the trough. In another embodiment of the present invention, the area defined between the outer retaining walls and the centrally disposed trough may be subdivided into a plurality of sections, each section being designed to accomodate a single animal.

8 Claims, 6 Drawing Figures

LIVESTOCK FEEDER

BACKGROUND OF THE INVENTION

1. Field of the Invention

The present invention is directed to a feeder-watering trough which is designed to ensure the safety of the animals utilizing the trough.

2. Description of the Prior Art

Many exemplary feeder-watering troughs are illustrated in the prior art. The majority of the prior art troughs are rectangular in shape. However, it is difficult to evenly distribute the feed positioned in a rectangular trough and therefore, the animals feeding therefrom frequently shove and kick in attempting to feed on the grain of an adjacent animal. Further, most prior art troughs include supports positioned adjacent to where the animal must stand when utilizing the trough. These supports cause injuries to the animals as they move about the trough during feeding.

A number of feeding troughs are available in the prior art which are designed to be positioned at ground level. For example, the Harman patent, U.S. Pat. No. 312,462; the Ottinger patent, U.S. Pat. No. 903,309; and the Fulton patent, U.S. Pat. No. 2,941,506 are designed to be positioned directly on the ground and would be primarily utilized to feed relatively small animals. Larger animals, for example, cows and horses would not readily be able to utilize the troughs disclosed in these prior art patents.

A number of troughs are available in the prior art which are positioned on the ground and include a cover over an upwardly projecting storage hopper. For example, the Worshman et al patent, U.S. Pat. No. 993,630; the Shiffer patent, U.S. Pat. No. 1,200,892; and the Kwash patent, U.S. Pat. No. 2,464,644 disclose troughs primarily used to feed poultry. The troughs include an upwardly projecting storage hopper with a closure cover positioned on the uppermost portion thereof. These troughs would not be suitable for feeding larger animals such as for example, horses and cows.

U.S. Pat. No. 3,491,724, issued to Sunner and U.S. Pat. No. 4,085,706 issued to Evans disclose weaning dishes for animals. Again, like the other prior art troughs discussed above, the weaning dishes are designed to be positioned on ground level.

The most pertinent trough disclosed in the prior art is the Moore patent, U.S. Pat. No. 3,205,860. The Moore patent discloses a stock feeder which includes a tube 10 divided into a plurality of compartments. The trough 10 is in communication with a storage hopper 11, 12 for continuously supplying feed to the tube. However, the Moore patent discloses a support frame 40, 60 which includes a plurality of downwardly projecting legs which are adjacent to the position of an animal utilizing the trough. Therefore, the stock feeder disclosed in the Moore patent may produce injuries to the legs of animals feeding from the trough.

The troughs disclosed in each of the above-mentioned patents suffer from disadvantages which are solved by the feeder-watering trough of the present invention. More particularly, the present invention sets forth a novel feeder-watering trough which includes a central support designed to adjustably position the height of the trough relative to ground level. In addition, the trough includes a centrally disposed portion with an inclined upper surface for evenly dividing feed poured into the trough onto the inclined surface. Supporting the feeder-watering trough from a central support minimizes injuries to the feet and legs of the animals utilizing the trough.

SUMMARY OF THE INVENTION

It is an object of the present invention to provide a feeder-watering trough designed for the safety of the animals utilizing the trough.

A further object of the present invention is to provide a feeder-watering trough with a centrally disposed portion connected by means of a bottom member to an outer retaining wall. The area defined between the outer retaining wall and the centrally disposed portion forms a sufficient space in which to position the feed for the animals.

A still further object of the present invention is to provide a feeder-watering trough with a recessed central support to minimize injury to the feet and legs of animals utilizing the trough.

Another object of the present invention is to provide a feeder-watering trough in a variety of shapes and sizes to conveniently position the desired number of animals around the trough.

A still further object of the present invention is to provide a feeder-watering trough which includes a central support which may adjust the height of the trough relative to ground level.

A still further object of the present invention is to construct a feeder-watering trough from a fiberglass material thereby overcoming deficiencies in the prior art troughs which are subject to rust and rot.

Another object of the present invention is to provide removable wall portions which may divide the trough into a plurality of areas for individual feeding of the animals.

These and other objects of the present invention are accomplished by providing a feeder-watering trough which is mounted on a central support. The central support is adjustable to thereby vary the height of the trough relative to the ground level. The feeder-watering trough includes a centrally disposed portion connected by means of a bottom member to an outer retaining wall. The centrally disposed portion includes an inclined upper surface which acts to evenly distribute the feed as it is poured thereon.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
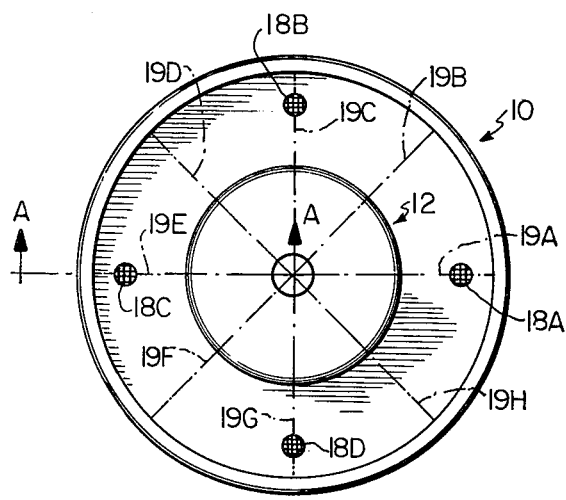
FIG. 1 is a plan view of the feeder-watering trough according to the present invention.

The feeder-watering trough of a preferred embodiment of the present invention, as illustrated in FIGS. 1, 2, 4 and 5, is generally referred to by character 10. The feeder-watering trough includes a centrally disposed portion 12 having a substantially horizontal top portion 13 and an inclined surface 14. In addition, the centrally disposed portion 12 includes a downwardly projecting central wall member 15 connected by a bottom member 16 to an outer retaining wall 17.

The area formed between the outer retaining wall 17 and the central wall member 15 is designed to retain feed or water which is conveniently located with respect to an animal utilizing the trough. An important aspect of the present invention is the inclined surface 14 which ensures even distribution of the feed as it is dispensed into the feeder-watering trough. As an individual holds a bag of feed over the feeder-watering trough and permits it to fall upon the inclined surface 14, the feed is evenly directed to the area formed between the outer retaining wall 17 and the central wall member 15. This feature of the present invention overcomes the disadvantages of prior art rectangular troughs in which it is difficult to evenly distribute the feed.

As illustrated in the drawings, recessed screens 18A–18D are positioned on the bottom member 16 to permit self draining of the feeder-watering trough. The screens are recessed to reduce the possibilities of injury to the muzzle and tongue of the animals feeding from the trough. Further, the screens may be removable to facilitate cleaning of the feeder-watering trough when particles of grain accumulate and clog the screens. It should be understood, that if the feeder-watering trough 10 is utilized as a watering trough that the screen openings may be blocked with a stopper to prevent the discharge of water from the trough.

Figure 4:
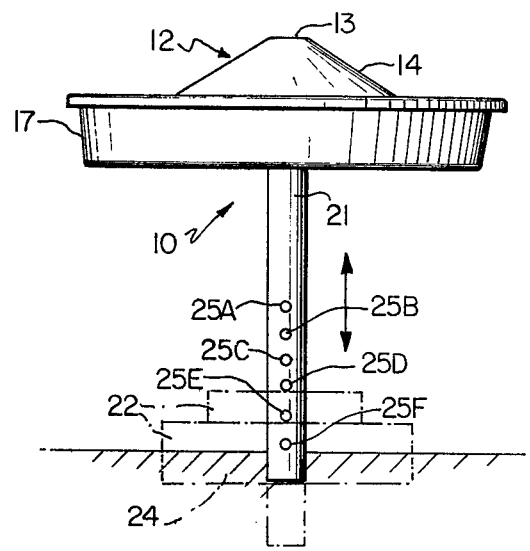
FIG. 4 is a side elevational view of the feeder-watering trough according to the present invention showing the adjustable central support for varying the height of the trough relative to the ground level.

As illustrated in FIG. 4, the feeder-watering trough 10 is positioned on a recessed central support 21. Recessing the central support 21 from the outer peripheral surface of the feeder-watering trough 10 ensures that the animals utilizing the trough do not injure their legs or feet as they paw or stomp the ground while eating.

The central support 21 may be mounted in a movable base 22 or mounted in a permanent anchor base 24. In either embodiment the movable base or the anchor base will include a centrally disposed opening for receiving the central support 21. As illustrated in FIG. 4, a plurality of openings 25A–25F are positioned in the central support 21. By positioning the central support 21 in a base member 22/24 and positioning a pin or similar affixing member through one of the openings 25A–24F the height of the feeder-watering trough 10 may be adjusted relative to the ground level. This adjustable height feature of the present invention is important since it permits the feeder-watering trough to be utilized by young animals and continued to be utilized as the animals mature.

Figure 2:
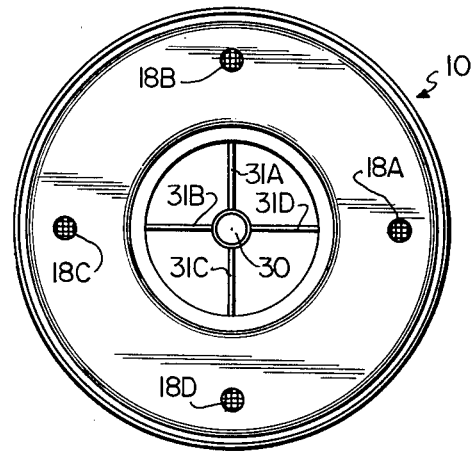
FIG. 2 is a bottom view of the feeder-watering trough according to the present invention.
Figure 5:
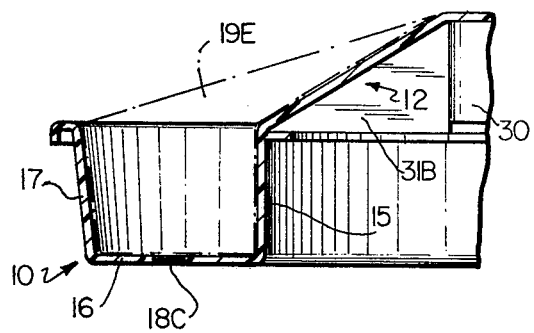
FIG. 5 is a cross-sectional view taken along line A—A of FIG. 1.

As illustrated in FIGS. 2 and 5, the feeder-watering trough includes a centrally disposed opening 30 positioned on the underside portion of the trough. The centrally disposed opening 30 includes outwardly projecting ribs 31A–31D which add rigidity to the support structure of the trough. The central support 21 is positioned in the centrally disposed opening 30 and may be locked or keyed thereto to prevent rotation of the feeder-watering trough relative to the central support. In another embodiment of the present invention, a spring may be positioned between the feeder-watering trough and the central support 21. A spring would permit relative movement between the feeder-watering trough and the central support 21 as an animal is pushed into the trough. Further, a spring would discourage the animals from playing in the trough since this would cause the trough to vibrate.

Figure 3:
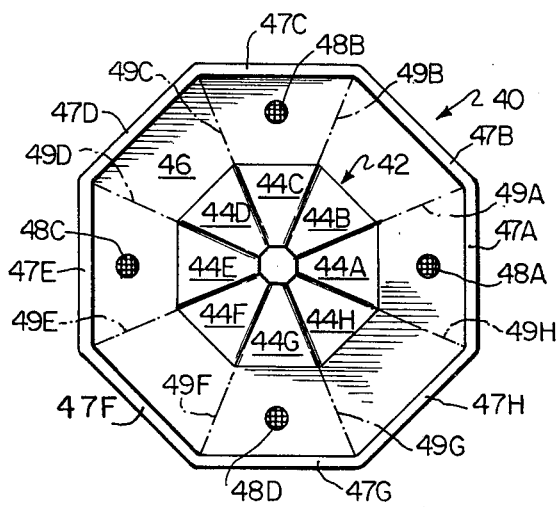
FIG. 3 is a plan view of a second embodiment of the feeder-watering trough of the present invention.

Another embodiment of the present invention is illustrated in FIG. 3. The feeder-watering trough 40 includes a centrally disposed portion 42 connected by a bottom member 46 to an outer retaining wall 47A–47H. The centrally disposed portion 42 includes an inclined surface 44A–44H which ensures even distribution of feed as it is poured onto the inclined surface. Although this embodiment of the present invention is octagonal in shape, any desired shape of forming the feeder-watering trough is intended to be included within the scope of the present invention.

The feeder-watering trough 40 includes a plurality of screens 48A–48D which permit draining. The screens 48A–48D may be constructed in the same manner as the screens 18A–18D described hereinabove.

Similar to the first embodiment of the present invention, the feeder-watering trough 40 is positioned on a central support, not illustrated, which may be adjustable relative to the ground level to enable adjustment of the height of the trough.

Figure 6:
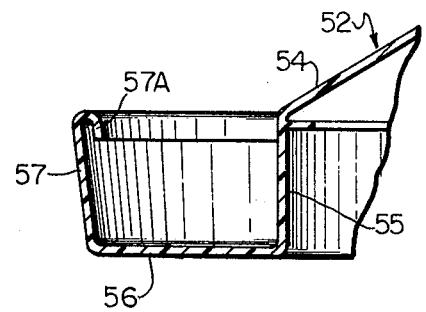
FIG. 6 is a cross-sectional view of another embodiment of the present invention.

FIG. 6 illustrates another embodiment of the present invention. The outer retaining wall 57 includes an inwardly curved lip 57A which prevents the discharge of grain from the trough as the animals are feeding therefrom. Similarly to the other embodiments of the present invention, the outer retaining wall 57 is connected by a bottom member 56 to a central wall member 55. The central wall member 55 is connected to an inclined surface 54 of the centrally disposed portion 52.

The present invention may include dividing wall members which will section the feeder-watering trough into any desired number of individual feeding sections. As illustrated in FIG. 1, a plurality of dividing wall members 19A–19H may be disposed within the area between the outer retaining walls 17 and the centrally disposed portion 12 to divide the trough into a plurality of sections. Although the embodiment illustrated in FIG. 1 shows the trough divided into eight (8) sections, the feeder-watering trough may be divided into any number of desired sections. Similarly, the embodiment of the present invention illustrated in FIG. 3 includes dividing wall members 49A–49H. Although the feeder-watering trough illustrated in FIG. 3 is divided into eight (8) sections, the trough may be divided into any desired number of sections.

The feeder-watering trough according to the present invention is relatively easily moved from one area to another. The feeder-watering trough 10 may be disengaged from the movable base member 22 or the permanent base member 24 and repositioned into another base member at a different location in the pasture or any other suitable area. The portable base member 22 may be moved with the feeder-watering trough 10 if desired. Moving the feeder-watering trough from one area to the other prevents muddy areas to develop in any particular portion of the pasture.

In a preferred embodiment of the present invention, the feeder-watering trough may be constructed of fiberglass. Although this material is preferred, the present invention is not limited to the particular material. Constructing the feeder-watering trough of fiberglass overcomes deficiencies in the prior art troughs which are subject to rust and rot.

The feeder-watering trough of the present invention is designed to ensure the safety of the animal utilizing the trough. The central support 21 is recessed inwardly to minimize injury to the feet and legs of animals utilizing the trough.

As discussed hereinabove, the inclined surface 14 of the feeder-watering trough 10 is designed to evenly distribute the feed to the area formed between the outer retaining wall 17 and the central wall member 15. In addition, the inclined surface 14 evenly distributes the weight of the feeder-watering trough together with any material disposed therein on the central support 21.

In an embodiment of the present invention the centrally disposed opening 30 may be rotatably mounted on the central support 21. In this embodiment an animal would not sustain an injury by accidentally bumping into the feeder-watering trough 10, instead the feeder-watering trough would rotate. Further, in another arrangement of this embodiment, the central support 21 may be rotatably mounted relative to the base member 22.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A feeder-watering trough comprising:
a unitary trough having an upwardly projecting centrally disposed portion, a bottom member and an outer retaining wall, said bottom member connecting said centrally disposed portion and said outer retaining wall together to form a continuous area in which feed or water may be positioned, said upwardly projecting central portion including a substantially centrally disposed opening on an underside portion of said trough;
a base member; and
at least one central support removably attached within said substantially centrally disposed opening of said unitary trough at an uppermost end thereof and being in adjustable engagement with said base member at a lower end thereof, said central support being designed to adjustably support said trough above ground level;
said upwardly projecting centrally disposed portion including an unobstructed inclined upper surface which ensures the even distribution of feed into said continuous area formed between said centrally disposed portion and said outer retaining wall and wherein said central support is positioned within said substantially centrally disposed opening of said unitary trough to provide an unobstructed area beneath said trough;
said outer retaining wall including an inwardly curved lip to prevent the discharge of feed or water over the top of said outer retaining wall.

2. A feeder-watering trough according to claim 1, wherein said at least one central support includes a plurality of openings therein which are designed to receive an affixing member which abuts against said base member to vertically adjust the height of the trough above ground level.

3. A feeder-watering trough according to claim 1, wherein said bottom member includes at least one opening to permit self draining of the trough.

4. A feeder-watering trough according to claim 3, wherein said at least one opening is covered by a screen.

5. A feeder-watering trough according to claim 1, wherein said unitary trough is circular.

6. A feeder-watering trough according to claim 1, wherein said unitary trough is multi-sided.

7. A feeder-watering trough according to claim 1, and further including a dividing wall positioned within the continuous area between the centrally disposed portion and said outer retaining wall to divide said unitary trough into a plurality of sections.

8. A feeder-watering trough according to claim 1, wherein said unitary trough is constructed of fiberglass.

* * * * *